(12) United States Patent
Bramble et al.

(10) Patent No.: US 11,504,605 B2
(45) Date of Patent: Nov. 22, 2022

(54) SENSOR DEVICE

(71) Applicant: Claw Revolution LLC, Albion, MI (US)

(72) Inventors: Ethan Bramble, Albion, MI (US); Jonathan Gallas, Parma, MI (US); Jeffrey Joseph Lumetta, South Lyon, MI (US)

(73) Assignee: Claw Revolution LLC, Albion, MI (US)

( * ) Notice: Subject to any disclaimer, the term of this patent is extended or adjusted under 35 U.S.C. 154(b) by 0 days.

(21) Appl. No.: 17/149,939

(22) Filed: Jan. 15, 2021

(65) Prior Publication Data
US 2021/0220727 A1 Jul. 22, 2021

Related U.S. Application Data

(60) Provisional application No. 62/962,420, filed on Jan. 17, 2020.

(51) Int. Cl.
| | |
|---|---|
| *A63F 13/211* | (2014.01) |
| *A63F 13/245* | (2014.01) |
| *A63F 13/812* | (2014.01) |
| *G01L 1/18* | (2006.01) |
| *G01P 1/07* | (2006.01) |
| *G01P 15/00* | (2006.01) |

(52) U.S. Cl.
CPC .......... *A63F 13/211* (2014.09); *A63F 13/245* (2014.09); *A63F 13/812* (2014.09); *G01L 1/18* (2013.01); *G01P 1/07* (2013.01); *G01P 15/00* (2013.01)

(58) Field of Classification Search
CPC .... A63F 13/211; A63F 13/245; A63F 13/812; G01L 1/18; G01L 5/22; G01P 15/00; G01P 1/07
See application file for complete search history.

(56) References Cited

U.S. PATENT DOCUMENTS

| | | | | |
|---|---|---|---|---|
| 3,792,863 A | * | 2/1974 | Evans ................ | A63B 69/3632 340/870.18 |
| 5,209,483 A | * | 5/1993 | Gedney ................ | G01L 5/0052 473/223 |
| 6,073,086 A | * | 6/2000 | Marinelli ................ | A63B 43/00 473/200 |
| 6,441,745 B1 | | 8/2002 | Gates | |
| 6,537,076 B2 | * | 3/2003 | McNitt .............. | A63B 24/0003 434/257 |
| 7,736,242 B2 | * | 6/2010 | Stites ................ | A63B 69/3632 473/223 |
| 7,789,742 B1 | * | 9/2010 | Murdock ............... | G16H 40/67 463/2 |
| 8,253,586 B1 | * | 8/2012 | Matak ................... | G01L 5/0095 340/870.07 |

(Continued)

*Primary Examiner* — William H McCulloch, Jr.
(74) *Attorney, Agent, or Firm* — The Dobrusin Law Firm, P.C.

(57) ABSTRACT

A sensor device includes a sleeve portion adapted to receive a portion of a golf club and a plurality of grip sensors on the sleeve portion. The grip sensors are adapted to sense information associated with a user's hands gripping the sleeve portion. The sensor device further includes a sensor assembly coupled to sleeve portion. The sensor assembly is adapted to sense the movement of the golf club by the user.

17 Claims, 9 Drawing Sheets

(56) References Cited

U.S. PATENT DOCUMENTS

| | | | | |
|---|---|---|---|---|
| 8,425,350 | B2* | 4/2013 | Savarese | A63B 43/00 156/145 |
| 8,861,091 | B2* | 10/2014 | French | A63B 24/0062 359/629 |
| 9,283,464 | B2* | 3/2016 | Nipper | A63B 24/0021 |
| 9,488,538 | B2 | 11/2016 | Thillainadarajah et al. | |
| 9,662,558 | B2* | 5/2017 | Murdock | A63F 13/79 |
| 9,773,330 | B1 | 9/2017 | Douglas et al. | |
| 9,802,129 | B2* | 10/2017 | Murdock | A61B 5/0205 |
| 9,889,346 | B2* | 2/2018 | Boggs | A63B 60/52 |
| 10,137,347 | B2* | 11/2018 | Thornton | A63B 53/04 |
| 10,159,885 | B2* | 12/2018 | Thornton | A63B 53/0466 |
| 10,220,285 | B2* | 3/2019 | Thornton | A63B 53/04 |
| 10,226,681 | B2* | 3/2019 | Thornton | G09B 19/0038 |
| 10,500,452 | B2* | 12/2019 | Wallans | G06F 1/1684 |
| 10,737,165 | B2* | 8/2020 | Murdock | A63F 13/814 |
| 2005/0134470 | A1* | 6/2005 | Bos | A63B 59/50 340/665 |
| 2005/0215340 | A1* | 9/2005 | Stites | A63B 60/42 473/233 |
| 2008/0076580 | A1* | 3/2008 | Murdock | A63B 24/0062 463/42 |
| 2008/0188310 | A1* | 8/2008 | Murdock | A63F 13/21 342/357.57 |
| 2011/0081978 | A1* | 4/2011 | Murdock | A63F 13/212 473/220 |
| 2011/0082571 | A1* | 4/2011 | Murdock | A63F 13/87 700/92 |
| 2011/0087344 | A1* | 4/2011 | Murdock | A63F 13/212 700/91 |
| 2011/0092260 | A1* | 4/2011 | Murdock | A61B 5/744 473/223 |
| 2011/0130223 | A1* | 6/2011 | Murdock | A63B 69/3614 473/409 |
| 2011/0151977 | A1* | 6/2011 | Murdock | A63B 24/0021 463/42 |
| 2011/0212757 | A1* | 9/2011 | Murdock | A63F 13/79 463/2 |
| 2011/0224012 | A1* | 9/2011 | Hashimoto | A63B 60/42 473/223 |
| 2011/0281621 | A1* | 11/2011 | Murdock | A61B 5/744 473/223 |
| 2014/0297007 | A1* | 10/2014 | Voutilainen | G09B 19/0038 700/91 |
| 2014/0366650 | A1* | 12/2014 | Thillainadarajah | A63B 69/36 73/862.625 |
| 2015/0065263 | A1* | 3/2015 | Luttrull | A63B 53/14 473/202 |
| 2016/0361592 | A1* | 12/2016 | Isogawa | G06V 40/23 |
| 2017/0004729 | A1* | 1/2017 | Kano | G09B 19/0038 |
| 2017/0282081 | A1* | 10/2017 | Murdock | A63F 13/812 |
| 2018/0065017 | A1* | 3/2018 | Murdock | A63F 13/212 |
| 2018/0117438 | A1* | 5/2018 | Murdock | A63F 13/245 |
| 2019/0094088 | A1* | 3/2019 | Reif | A61B 5/6807 |
| 2019/0388761 | A1 | 12/2019 | Bartek et al. | |
| 2021/0220727 | A1* | 7/2021 | Bramble | G01P 1/07 |

* cited by examiner

FIG. 9 ofSENSOR DEVICE

PRIORITY

This application claims priority to U.S. Provisional Application 62/962,420 filed Jan. 17, 2020, the entirety of which is hereby incorporated by reference for all purposes.

FIELD

These teachings relate generally to a sensor device for sensing information associated with a user's golf swing, and more particularly a sensor device that is affixed to a user's golf club for sensing information relating to the kinematic movements of the golf club and a user's hand griping the golf club.

BACKGROUND

Some golf training aides include sensors for collecting information about a user's golf swing. For example, some golf training aides include sensors that are permanently affixed to a dedicated training golf club and thus are not useful on a user's own golf clubs. In other examples, golf training aides include sensors that are selectively attached to portions of a user's golf club that may move, become unattached or protrude from the golf club and thus may obstruct the user's golf swing. In yet other examples, golf training aides include sensors that measure a particular facet of a user's golf swing, and thus do not measure other facets of a user's golf swing or combine the several facets that affect the complex motion and control.

While these currently available systems are adequate for their intended purpose, each has disadvantages, and it may be desirable to provide an improved device.

SUMMARY

These teachings provide a sensor device comprised of a sleeve portion adapted to receive a portion of a golf club. The sensor device includes a plurality of grip sensors on the sleeve portion that are adapted to sense information associated with a user's hands gripping the sleeve portion and a sensor assembly adapted to sense the movement of the golf club by the user. Together, the grip sensors and the sensor assembly can collect information before, during and after a user's golf swing about several facets of a user's golf swing which may be analyzed either by a golf teacher or an automated system to provide feedback and instruction to the user. The simultaneous collection of information by the grip sensors and the sensor assembly improves the understanding of the several forces imparted on the golf club when swung, and thus on a golf ball when impacted by the club.

The teachings further provide a sensor device which may be readily installed or removed from different golf clubs having varying grips (ex. putter and iron), among several different clubs having the same grip (wedge and 7-iron), or between golf clubs of different users (user 1 and user 2). The sensor device improves the orientation and spacing of the grip sensors and sensor assembly on each club. Specifically, the sensor device is configured to locate the grip sensors at a specific location on a golf club and or golf club grip such that each of the grip sensors senses a specific and discrete portion of a user's hand. Specifically, the sensor device is configured to locate the sensor assembly at the butt end of the club, generally along an axis defining the centerline of a shaft of a club, such that motions sensors improve measurement of kinematic motion of the club, including twist of the golf club shaft. Further, the sensor device improves relative spacing and orientation of the grip sensors and the sensor assembly. Specifically, the sensor device is configured to improve the spacing and orientation of the grip sensors and sensor assembly with respect to each other before and during a user's golf swing, such that a static sensor spacing and orientation relationship is preserved to allow for accurate collection of data from sensors and simplified analysis of a user's swing. The present inventions may provide all of these advantages and more as described herein and as will be appreciated by a person of skill in the art.

DETAILED DESCRIPTION

Figure 1:
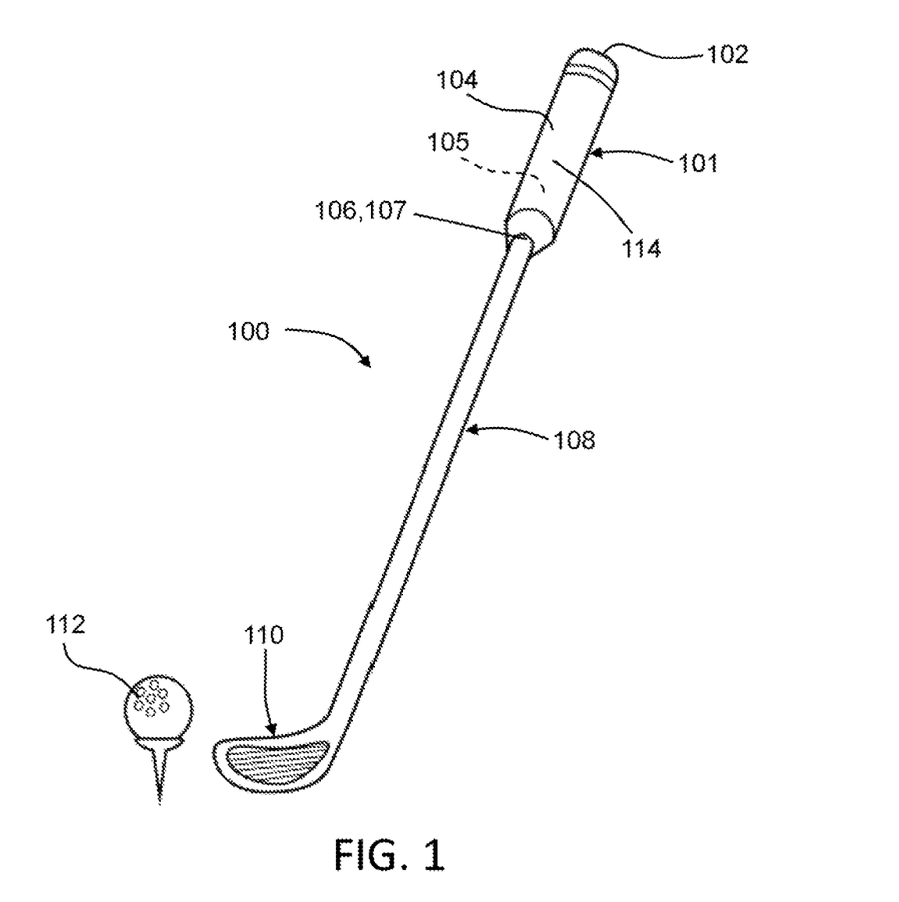
FIG. 1 illustrates a golf club and golf ball.

A golf club 100 is shown in FIG. 1. The golf club 100 comprises a grip 101, a shaft 108 and a head 110. The grip 101 is typically arranged at a distal end of the shaft 108, spaced away from the head 110, which is used to strike a golf ball 112. The grip 101 generally includes a butt end 102, a central portion 104 containing a bore 105 for receiving a portion of the shaft 108, and a bottom end 106 with an aperture 107 for receiving a portion of the shaft 108 and defining an end of the bore 105. When properly installed on the shaft 108 of the club 100, the grip 101 provides a gripping surface 114 for a user's hands to grip the golf club 100 during a swing. Many commercially available grips 101 have a grip surface 114 along the central portion of the grip 101 that is widest proximal to the butt end 102 and narrower proximal to the bottom end 106, and have a generally circular cross section. Said another way, many commercially available grips 101 have a grip surface 114 that is frustum conical in shape. However, some golf clubs, such as putters, may have grips 101 with an outer surface 114 that has a consistent cross section, either across the entire central portion or a portion of the central portion.

Figure 2A:
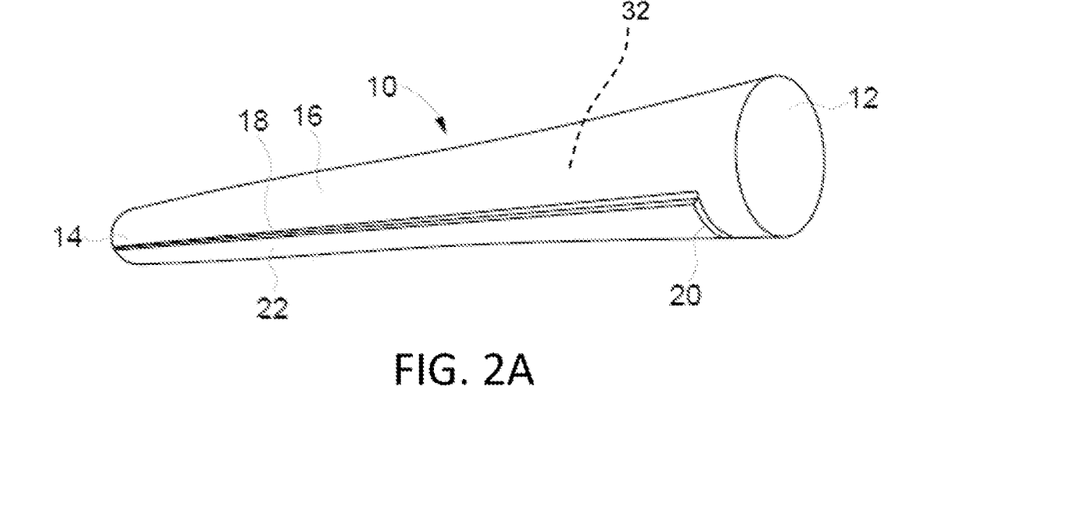
FIGS. 2A and 2B are each perspective views of the sensor device.
Figure 2B:
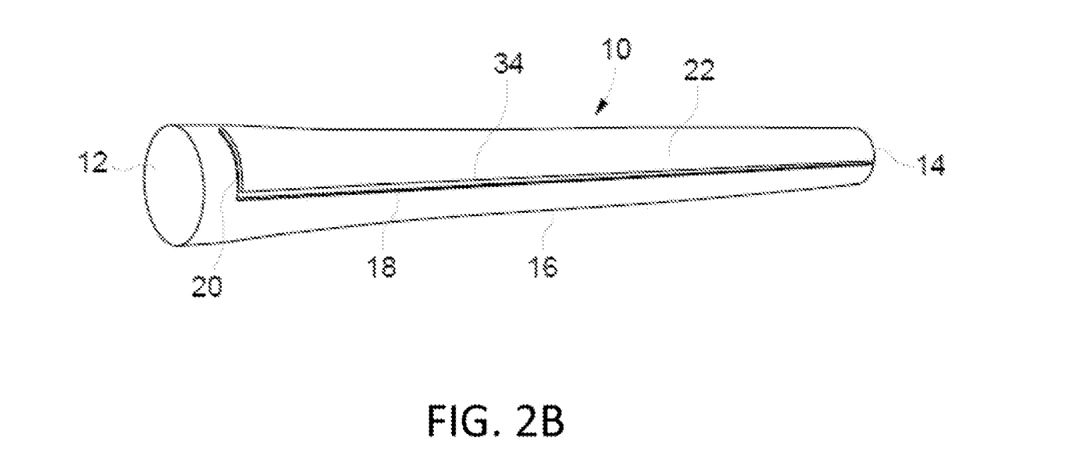

FIGS. 2A and 26 each show a sensor device 100 according to these teachings that can be utilized with any golf club 100 to sense and collect various data associated with a user's golf swing, grip on the golf club 100, hand placement on the golf club 100, and/or hand placement before and after a swing, as described below. The sensor device 10 includes a first end 12, a second end 14, and a sleeve portion 16 that extends between the first end 12 and the second end 14. The sleeve portion 16 and second end 14 include an aperture 32 that is formed or configured to receive a portion of a golf club 100, particularly the grip 101 and/or shaft 108 of the club 100, as discussed below.

The senor device 10 is generally affixed to the distal end of the shaft 108 or grip 101, away from the head 110, and receives a portion of the shaft 108 or grip 101, or both, as described below. An embodiment of the present invention shows the sensor device 10 configured to receive a portion of the grip 101. In a preferred embodiment, the sensor device 10 is installed over the butt end 102 of the grip 101 and a receives a portion of the central portion 104 of the grip 101 to allow a user to hold the sensor device 10 in a way similar to holding just the grip 101. It is also contemplated that the sensor device 10 may receive only a portion of the central portion 104, and thus a portion of the grip surface 114 to allow a user to contact the sensor device 10 and grip surface 114 at the same time while swinging the golf club 100. In some configurations, the sensor device 10 may be the grip 101. In such a configuration, the sensor device 10 may be attached directly to the shaft 108 of the club. The sensor device 10 may be permanently or removably attached to the golf club 100. Permanently attached means that the sensor device 10 cannot be separated or removed from the club without damaging the grip 101, the club 100, the sensor device 10, or a combination thereof. Removably attached means that the sensor device 10 can be separated or removed from the club without damaging the grip 101, the club 100, the sensor device 10, or a combination thereof.

Sensor device 10 comprises a flap 22 that may be partially defined by a slit 18 disposed along all or a portion of a longitudinal length of the sleeve portion 16. An additional slit 20 may also be included on the sleeve portion 16 or another portion of the sensor device 10 to further define the flap 22. Slit 20 may be generally perpendicular to slit 18, radially arranged around at least a portion of the circumference of the device 10, or arranged at any angle to slit 20. Flap 22 is configured to be selectively moved to allow for insertion of a portion of a golf club 100, particularly the grip 101 and/or shaft 108 into the aperture 32 of the sensor device 10. In the preferred embodiment, the slit 18, and optionally slit 20, allow the flap 22 to be moved, such as by deforming an edge 34 of flap 22 to allow expanded access to the aperture 32. While the sleeve portion 16 is shown with a flap 22 defined by a slit 18 and 20, the flap 22 can be formed in various configurations, such as a movable rigid or flexible panel that is removably or permanently connected to a portion of the sleeve portion 16. Further, the flap 22 may be formed of the same material as the sleeve portion or of a different material. Further, the flap 22 may include other fastening devices such as zippers, ties, snaps, clips, hook and loop fasteners, magnets, or other fasteners for providing selective access to the aperture 32 to allow installation of a portion of a golf club 100, particularly the grip 101 and/or shaft 108 and rigid connection of the sensor device 10 to the portion of a golf club 100, particularly the grip 101 and/or shaft 108 when disposed within the aperture 32. The other fastening devices may also provide for the device 10 to have an adjustable fit, depending on the size of the grip 101 and/or club that the device 10 is used with. (e.g., some grips are larger, smaller, and/or have different cross-sectional shapes). Additionally, as described below, because the device 10 may be used with other devices not just golf clubs (e.g., hockey sticks, tennis racquets, barbells, bow and arrow, etc.), it may be desirable to have an adjustable grip to fit various equipment thus allowing the device 10 to be versatile.

Additionally, or alternatively, the device 10 may include one or more slits or openings at or near the opening 14 of the device 10 to allow for the device 10 to be slipped onto the grip 101, for example by moving or sliding the device 10 over the grip 101 and sliding the device 100 along a longitudinal axis of the grip 101 or club 100 in a direction of the head 110. In some configurations, the device 10 may be integrally or permanently attached to the grip 101, such that the device 100 cannot be removed or separated from the grip 101 or club 100, without damaging or destroying the grip 101, the club 100, and/or the device 100. In some configurations, the device 100 may be the grip 101. A device 100 that can be removed from the grip 101 or club 100 without damaging or destroying the grip 101, club 100, and/or device 10 may be advantageous in that the device 10 may be installed and used on any number of clubs 100, for example putters, drivers, and/or irons.

In some configurations, the device 100 may also be installed and used on other clubs or sticks for other sports, like hockey sticks, baseball bats, racquets for tennis and/or squash, and the like. In some configurations, the device 100 may also be installed and used on a video game system or devices and simulators like joysticks. Accordingly, while grip 101 and/or club 100 used in this disclosure focus on a golf club, it is understood that the grip 101 and/or the club 101 can be virtually any device that is held and/or gripped by one or more users. For example, the grip 101 and/or club 100 may be a handgun, a dumbbell or barbell, a shovel, a hammer, a rolling pin, a knife, a bow, a steering wheel, a bicycle, and the like. Using the device 10 according to these teachings with any of the aforementioned devices and/or like devices not mentioned herein in the interest of brevity may be beneficial to provide feedback to a user, instructor, and/or supervisor that the grip and/or device is being held and/or manipulated properly by the user's hands.

Figure 3:
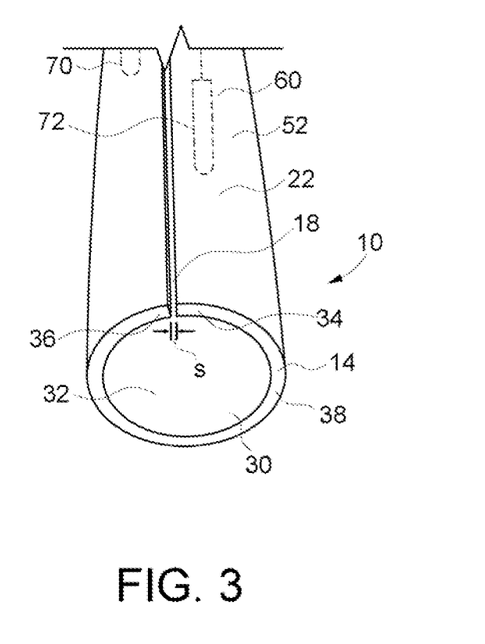
FIG. 3 is partial perspective view of an end of the sensor device.

FIG. 3 illustrates the second end 14 and a portion of the sleeve portion 16 of the sensor device 10. As can be seen, the slit 18 is defined by a first edge 34 that is a portion of the slit 18 and a second edge 36 that is a portion of the sleeve portion 16. The slit 18 is shown to have a width S wherein the edges 34 and 36 are spaced apart. However, slit 18 may also be formed such that edges 34 and 36 are in contact over a portion of the entire length of the slit. Further, the slit 18 may be formed such that the edges 34 and 36 overlap one another.

Sleeve portion 16 is preferably formed to have a thickness 38 that is uniform across its length to provide an outer surface 52, which is gripped by a user a of the sensor device, that is offset a consistent distance from the central portion 104 of a golf grip 101. However, the thickness 38 of sleeve portion 16 may include one or more recesses, protrusions, or other variations in thickness to allow the user to properly grip the outer surface 52 of the sensor device 10. Further, the thickness 38 of sleeve portion 16 may be varied along its length to allow, such as by consistent taper, varying taper, patterns, or specific geometries to improve the users grip of the outer surface 52 of the sensor device 10. The sleeve portion 16 or device 10 may have a minimal thickness. This may advantageously provide for a good natural feel for a user holding the golf club. In other words, if the device 10 or sleeve portion 16 is too thick, it may be awkward for a user to properly hold/grip the device 10 and club. Thus, a minimum thickness is preferred so that a user can practice their grip and swing as if they were naturally holding their club or grip.

The sleeve portion 16 of the sensor device 10 preferably includes a plurality of grip sensors 60 to detect the presence, absence, pressure and/or variation in the presence and or pressure before, during, and/or after a user's swing of a club 100 with the sensor device 10. The grip sensors 60 may include a plurality of sensors 66. 68. 70, 72 to sense discrete portions of a user's hands or fingers, or palm and are fully described in detail FIG. 6. FIG. 3 shows grip sensors 70 and 72 as the sensor device 10 is shown in the partial perspective view. Grip sensors 60 are preferably to be coupled to and disposed in the thickness 38 of the sleeve portion 16, or said another way fully embedded within the sleeve portion, or not visible at the outer surface 52 and inner surface 54 of the sleeve portion 16. The one or more grip sensors 60 may be embedded into a thickness of the material of the sleeve portion 16. However, in another embodiment, the grip sensors 60 may be positioned on the outer surface 52 or on the inner surface 54 of the sleeve portion and in contact with the shaft 108 or grip 101. In a further embodiment, the grip sensors 60 may be at least partially embedded in the thickness 38 of the sleeve portion 16, with only a portion of the grip sensors 60 protruding from one or both of the outer surface 52 and the inner surface 54. In yet another embodiment, the grip sensors 60 may be removable from the sleeve portion 16 to allow for the grip sensors 60 to be added, removed, changed, either for repair or for a different hand configuration of the user, such as left-handed versus right handed, or for use with other equipment (e.g., hockey stocks, barbells, bow and arrow). In another embodiment, sensors 70 and 72 may both be disposed within one or both of the flap portion 22 and sleeve portion 16.

Further, the sensor device 10 may include an indicia or other physical feature to indicate or promote the proper orientation of the grip sensors 60 with respect to the golf club 100, grip 101 or a portion of either the golf club 100 or grip 101. Specifically, the sensor device 10 and grip sensors 60 may be configured and arranged such that the slit 18, or flap 22 are preferably installed on the golf club 100 or grip 101 to be opposite of the club head 110 for proper orientation of the grip sensors 60. Alternatively, or in addition, the sensor device 10 and grip sensors 60 may be configured and arranged such an indicia is provided on the sensor device 10 to align with the club head 110 for proper orientation of the grip sensors 60. The indicia may be one or more markings, grooves, lights, tactical bumps or protrusions, or a combination thereof. The indicia may make holding the device 10 awkward when a user's grip is incorrect and may make holding the device 10 comfortable when a user's grip is correctly gripping the device 10.

As shown in FIG. 3, sensor 72 is arranged within the flap 22 of the sleeve portion 16 and at a location along the length of the sleeve portion 16 closer or proximal to the second end 15. This placement of sensor 72 allows for sensing a discrete portion of a user' hand such as the index finger of the trailing hand (e.g. right hand for right-handed golfer, and left hand for left-handed golfer). The sensor 72 is preferably formed in an elongated shape, such as a rectangle, and the sensor 72 is arranged such that the elongated direction of the shape sensor 72 is aligned the grip 101 of the golf club, or sensor device 10. However, the sensor 72 may also be arranged such that the elongated direction of the sensor 72 shape is angled with respect to the grip 101 of the golf club, or sensor device 10. Further, the sensor 72 may also be formed in other shapes, such as squares, circles, ovals, to optimally detect the discrete portion of a user' hand being sensed by the sensor 72.

Also, as shown in FIG. 3, sensor 70 is arranged within the of the sleeve portion 16, but not within the flap 22, and a location along the length of the sleeve portion relatively closer to the center or spaced upward from the sensor 72 and second end 14. This placement of sensor 70 allows for sensing another discrete portion of a user' hand, particularly the index or ring finger of the trail hand. The sensor 70 is preferably formed in an elongated shape, such as a rectangle, and the sensor 70 is arranged such that the elongated direction of the sensor 70 shape is angled with respect to the grip 101 of the golf club, or sensor device 10. However, the sensor 70 may also be arranged such that the elongated direction of shape the sensor 70 is angled with respect to the grip 101 of the golf club 100, or sensor device 10. Further, the sensor 70 may also be formed in other shapes, such as squares, circles, ovals, to optimally detect the discrete portion of a user' hand being sensed by the sensor 70.

Figure 4:
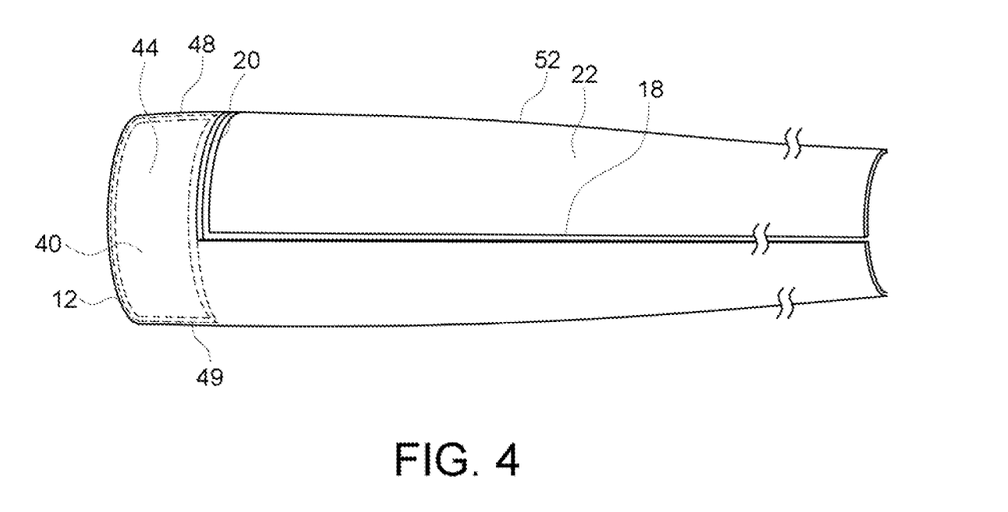
FIG. 4 is a front view of the sensor device.

FIG. 4 illustrates the second end 14 and another portion of the sleeve portion 16 of the sensor device 10. The sensor device 10 includes a sensor assembly 40 that is positioned at the first end 12 to sense the movement of the golf club 101 during a swing by the user. The sensor assembly is preferably located at the end 12 such that a portion of the sensor assembly to aligns with a center of the shaft 108 which defines a centerline of the club 100 to improve kinematic modeling of the golf swing. Further, the sensor assembly 40 is preferably positioned proximal to the butt end 102 of the golf club 100 to reduce physical contact of the sensor assembly 40 or the first end 10 of the sensor device with the user while the user is swinging the golf club 100.

Figure 8:
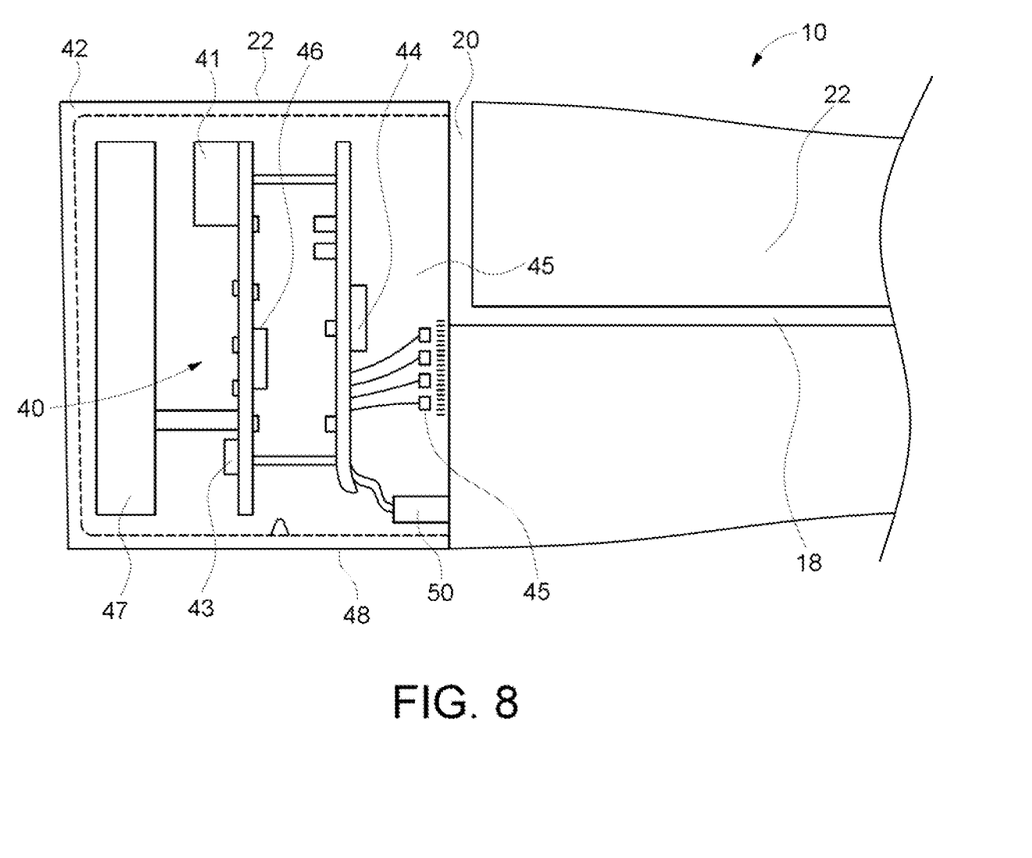
FIG. 8 is a diagram of the sensor assembly.

FIG. 8 illustrates the sensor assembly 40 disposed at the first end 12 of the sensor device 10. However, it is understood that the sensor assembly 40 may be located at any portion of the device 10 (ie., in the middle, closer to the second end). The sensor assembly includes one or more motion sensors 44, such as an accelerometer to sense acceleration, and a gyroscope to sense rotational movements. The one or more motions sensors 40 provide data to one or more processors and associated memory 46 to store, analyze, and/or transmit data related to the user's golf swing. The processors and memory may be located on the device 10 and/or at a discrete location such as a mobile computer or phone or cloud. The processor and/or memory on the device 10 and/or external to the device may include one or more algorithms or look up tables to process or compute the data received from the one or more sensors of the sensor device 10 and/or sensor assembly. Data may be transmitted to an eternal discrete memory and/or processor via cellular, Bluetooth, WIFI, etc. In a preferred embodiment, the sensor assembly 40 includes a battery 47 providing electrical energy to the processor 46 and the motion sensors 40. The battery 47 may be removable from the sensor assembly 40 or permanently affixed to the sensor assembly 40. The battery 47 may be rechargeable wirelessly, or through a plug or port on the sensor device 10, preferably at the end portion 12.

The sensor assembly 40 may also include a speaker 41 in communication with the processor and memory 46 to provide an audible signal. The speaker 41 may provide an audible signal indicating information sensed by the motion sensors 44, the grip sensors 60 or the combination of both the motion sensors 44 and the grip sensors 60, such as a speed of the club head 110. The speaker 41 may provide an audible signal indicating information about a portion of the sensor assembly 40, such as a state of charge of the battery. The speaker 41 may provide an audible signal indicating feedback on the user's golf swing processed by the processor and memory 46, such as an instruction to improve the user's golf swing. Feedback may also be provided by way of one or more vibrations or pulses to improve or change a user's grip or hand position.

The sensor assembly 40 may also include one or more visual indicators 45, such as one or more LED, to provide a signal or cue to the user of the sensor device 10. The visual indicator 45 may provide a visual signal indicating information sensed by the motion sensors 44, the grip sensors 60 or the combination of both the motion sensors 44 and the grip sensors 60, such as a speed of the club head 110. The visual indicator 45 may provide a visual indicator 45 signal indicating information about a portion of the sensor assembly 40, such as a state of charge of the battery. The visual indicator 45 may provide a visual indicator 45 signal indicating feedback on the user's golf swing processed by the processor and memory 46, such as an instruction to improve the user's golf swing.

Sensor assembly 40 may also include one or more other sensors, such as a proximity sensor, a global positioning sensor, temperature sensor, pressure sensor, position sensor, motion sensor, level sensor, altitude sensor, force sensor, contact sensors, non-contact sensors, vision and imaging sensors, transducers, potentiometers, photoelectric sensors, alcohol sensor. Interestingly, an alcohol sensor may be used to sense a user's alcohol blood alcohol content (BAC) to correlate any related changes and/or anomalies to a user's swing. Any of these sensors may be used with any of the examples provided herein.

Sensor assembly 40 is preferably disposed within the first end 12 of the sensor device 10, such that sensor assembly 40 is not visible through an outer surface of the sensor device 10. In a preferred embodiment, the sensor assembly 40 is embedded within the material defining the first end 12 of the sensor device 10, such as by encapsulation, over-molding, or other techniques. In another embodiment, the first end 12 includes an outer surface 48 that overlies the sensor assembly and is generally aligned with the outer surface 52 of the sleeve portion to further conceal the sensor assembly 40 and improve the visual appearance of the sensor device 10. In another embodiment, the sensor assembly 40 is disposed within a recess 49 formed in the first end 12 of the sensor device 10. Recess 49 is sized and configured to retain sensor assembly 40 and may be accessible from the aperture 32. In some configurations, the sensor device may extend beyond the first end 12 of the device 10 and the club 100 and the grip 101, so as to not interfere with a user's grip.

Figure 5:
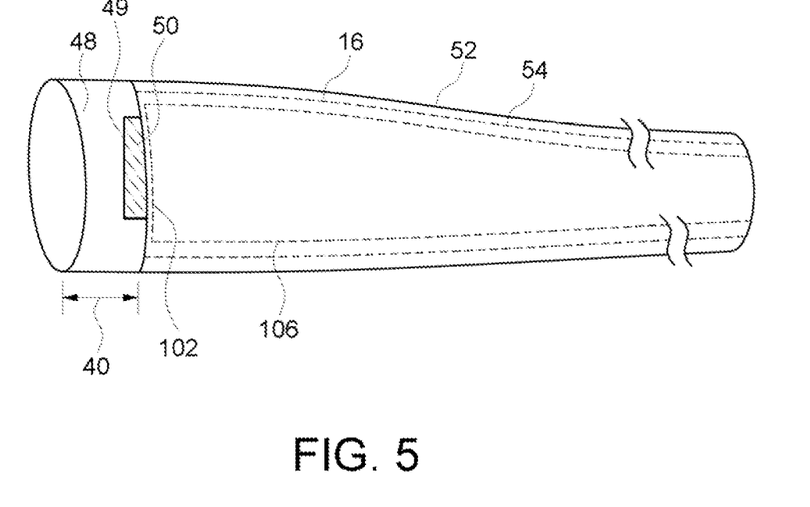
FIG. 5 is a front view of the sensor devices installed on a portion of a grip of a golf club.

FIG. 5 shows another embodiment of the sensor device 10 wherein the outer surface 48 of end 12 includes an aperture 51 that extends to a portion of the sensor assembly 40. Sensor assembly 40 may be visible or extend through the aperture 51. Aperture 51 may be used to provide as a visual or audible indication or signal from the sensor assembly 40, or physical access the sensor assembly 40 such as a connector for charging of a battery 47 or other energy storage device for the sensor assembly 40, or uploading to or downloading data from the sensor assembly. Further aperture 51 may be used to provide for removal, adjustment or alignment of the sensor assembly 40 with respect to the sensor device 10 and or golf club 100 or golf grip 101.

Figure 6:
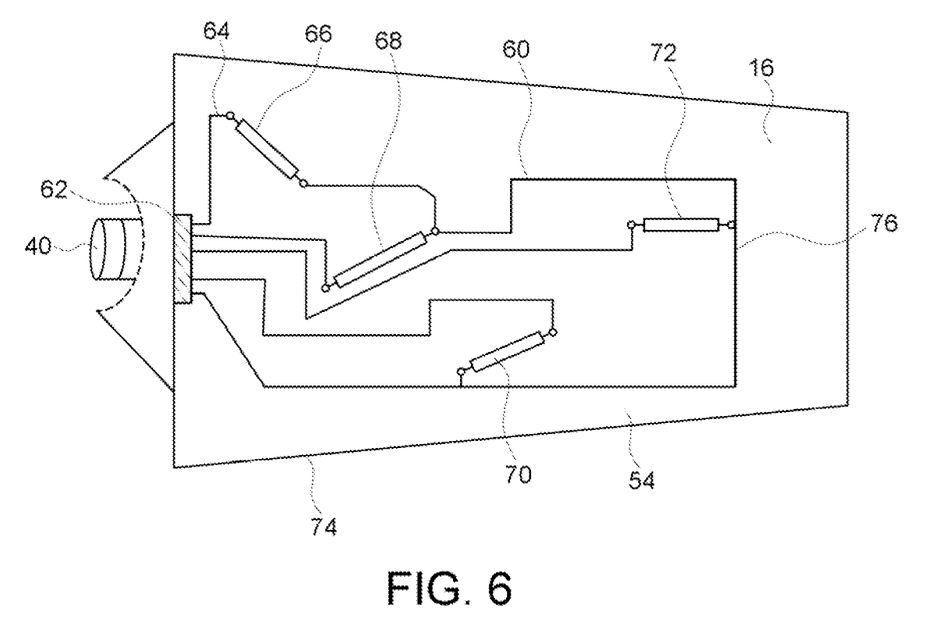
FIG. 6 is a perspective view of a grip sensor assembly.

FIG. 6 illustrates the grip sensors 60 of sensor device 10. Preferably, the grip sensors 60 include a plurality of sensors 66, 68, 70, 72 to sense discrete portions of a user's hand on the outer surface 52 of the sensor device 10. The sensors 66, 68, 70, 72 are connected by a plurality of electrical traces 64 to carry electrical signals between the sensors. The sensors and electrical traces are preferably formed on a flexible member 74, such as flexible printed circuit boards 76. The flexible printed circuit boards 76 are preferably formed in a single part, such that the orientation and arrangement of the sensors 66, 68, 70, 72 are maintained. However, the flexible printed circuit boards 76 may comprise more than one part. The flexible printed circuit boards 76 is preferably embedded within the thickness 38 of the sleeve portion 16 as discussed above. Also, the flexible printed circuit boards 76 may be combined into a single, multi-layer board without departing from the scope of the present invention.

The sensors 66, 68, 70, 72 are preferably piezoresistive sensors, which provide a change in the electrical resistivity of a semiconductor or metal within the sensor when a mechanical strain is applied. In the present embodiment, the piezoresistive sensors sense strain exerted by the hand of a user when gripping the grip 101 of the golf club 100. Further, the piezoresistive sensors sense strain exerted by the hand of a user during the entire swing of golf club 101 (before, during, and after the swing), measuring a plurality of values which are used to determine the several forces exerted on the golf club at varying times during the swing.

As shown in FIG. 6, the sensor assembly 40 is connected to and collects information from the grip sensors 60. Specifically, the grip sensors 60 are coupled to the sensor assembly 40 by a connection 62 for transferring electrical signals from grip sensors 60. Connection 62 is preferably a flexible connection, such as a flex circuit, film traces, wires, or other durable connection. Connection 62 may be wireless.

Further, as can be seen in FIG. 6 in addition to connection 62 the grip sensors 60 and the sensor assembly 40 are also physically connected to each other to maintain a specific relative spacing and orientation that is important to the operation of the sensor device. The grip sensors 60 and the sensor assembly 40 are spaced apart from one another such when the sensor device 10 is installed on a golf club 100, the sensor assembly 40 is disposed proximal to the butt end 102 of the golf club 100 and the grip sensor 60 is proximal to the grip 101 and spaced apart from sensor assembly. The spacing and orientation of the grip sensors 60 and the sensor assembly 40 is maintained through the physical properties of the materials that comprise the sleeve portion 16 and first end portion 12. Specifically, both the grip sensors 60 and the sensor assembly 40 are fixed with respect sleeve portion 16 and first end portion 12, through embedding, attachment, encapsulation or other securement to the material that comprises such and thus maintain a specific spacing and orientation when installed on a golf club 100.

When the forces exerted on the golf club 100, as measured through the grip sensors 60 are combined with the kinematic data from the sensor assembly 40 which includes the motion sensors 50, maintained at a fixed spacing and orientation with respect to the grip sensors 60, a true and accurate characterization of dynamic motions of the golf swing can be captured. The physical connection that spaces and orients the grip sensor 60 and sensor assembly 40 must be maintained, before, during and after a swing, as the software, algorithms, or other control systems obtain data from the multiple sensors such as the grip sensor 60 and sensor assembly 40, including the motion sensors contain geometric relationships and models related to the specific orientation and spacing of the grip sensor 60 and sensor assembly 40 to accurately analyze and characterize the golf swing.

The sensors 66, 68, 70, 72 are preferably arranged to sense discrete portions of a user's hand on the outer surface 52 of the sensor device 10. Preferably, for a right-handed golfer, sensor 66 detects the left palm, sensor 68 detects the left thumb, sensor 70 detects the right palm, and sensor 72 detects the right thumb. In another embodiment sensors 66, 68, 70, 72 may be arranged in another configuration to sense the discrete portions of a user's hands, with different orientations, placements. Further, different sensor types may be used in addition or other than piezoresistive sensors.

Preferably, the sensors 66, 68, 70, 72 are disposed on the sleeve portion 16 and/or flap 22 as discussed above such that the sensors that sense a discrete portion of a user's hand are each located on a different hemispherical side of the sleeve portion 16 when installed on a golf club. In a preferred embodiment, sensors 70 and 72 are each located on a different hemispherical side of the sleeve portion 16 when installed and sensors 66 and 68 are each located on a different hemispherical side of the sleeve portion 16 when installed.

Figure 7:
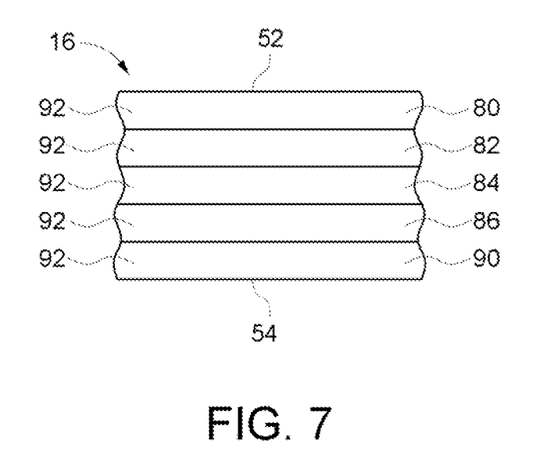
FIG. 7 is a cross sectional view of the of the layers in the sensor device.

FIG. 7 shows the layer construction of the sensor device 10, particularly in the sleeve portion 16 with the grip sensors 60. The sleeve portion 16 preferably includes a plurality of layers, as detailed below in the present embodiment. However, other embodiments may include fewer or additional layers, or combined layers wherein the function or parts of a layer are contained in a fewer layers.

Preferably the sleeve portion 16 includes a grip layer 82, which contains the outer surface 52 contacts the hands of a user when the user grips the sensor device 10. The grip layer 80 is preferably composed of a durable material, such a rubberized materials, elastomers, or polymers. Below the grip layer 80, an outer layer 82 is disposed which is preferably formed of a polyimide and contains a flexible printed circuit board 76. An adhesive is preferably included between the grip layer 80 and the outer layer 82. Below the outer layer 82, a sensor layer 84 is disposed which is preferably contains to sensors 66, 68 70, and 72, preferably piezoresistive sensors. An adhesive is preferably included between the outer layer 82 and the sensor layer 84. Below the sensor layer 84, an inner layer 86 is disposed which is preferably formed of a polyimide and contains a flexible printed circuit board 76. An adhesive is preferably included between the sensor layer 84 and the inner layer 86. Below the inner layer is a coating layer 88 that is preferably composed of a durable material, such a rubberized materials, elastomers, and polymers. The inner layer contacts the grip 101, shaft 108 or both grip 101 and shaft 108 of the golf club.

Figure 9:
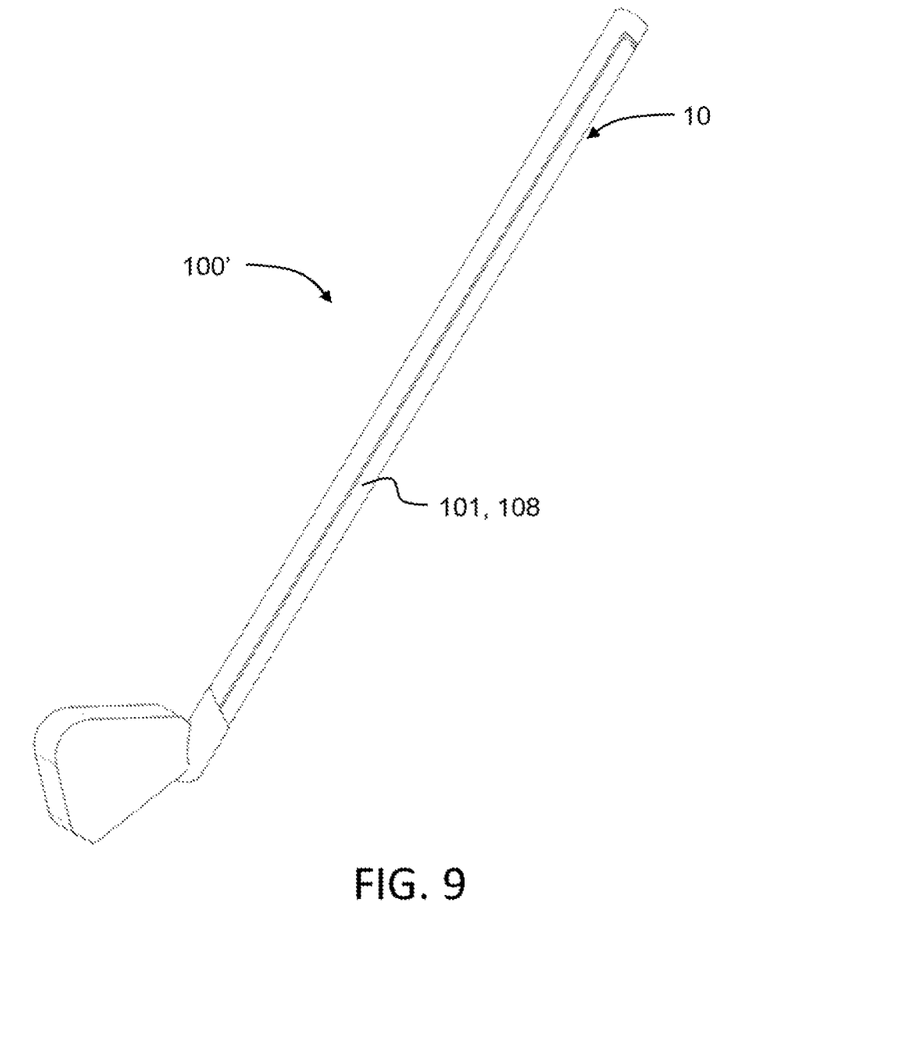
FIG. 9 shows a golf club that may be used for video games or virtual reality (VR) systems.

FIG. 9 illustrates a club 100' that may be used with a video game or virtual reality (VR) game or golf simulator. The device 10 according to these teachings may be applied onto the shaft 108 or grip 101, similar to what was described above. The device 10 may be used to provide feedback to a video game console or processor. The device 10 may be removable from the club 100' and installed onto other video game clubs or devices. In some configurations, the device 10 may be installed onto a club 100, such as the one illustrated in FIG. 1. This may permit the same device 10 to be used on both an actual club 100 and a video game club 100' or joystick. Again, the joystick need not be a golf club, but can be any device, such as a baseball bat, bowling ball, tennis racquet, hocket stick, and the like.

Some potential advantages of the embodiments of the present invention are detailed below. The grip sensors 60 and the sensor assembly 40 may collect information before, during and after a user's golf swing about several facets of a user's golf swing which may be analyzed either by a golf teacher or an automated system to provide feedback and instruction to the user. The simultaneous collection of information by the grip sensors 60 and the sensor assembly 40 improves the understanding of the several forces imparted on the golf club 100 when swung, and thus on a golf ball 112 when impacted by the club 100. Further, the sensor device 10 may be readily installed or removed from different golf clubs having varying grips (ex. putter and iron), among several different clubs having the same grip (wedge and 7-iron), or between golf clubs of different users (user 1 and user 2). The sensor device 10 improves the orientation and spacing of the grip sensors 60 and sensor assembly 40 on each club, regardless of grip, club length or club type. Specifically, the sensor device 10 may located such that the grip sensors 60 are at a specific location on a golf club 100 and or golf club grip such that each of the grip sensors 60 senses a specific and discrete portion of a user's hand. Specifically, the sensor device 10 may be configured to locate the sensor assembly 40 at the butt end of the golf club 100, generally along an axis defining the centerline of a shaft 108 of a club, such that motions sensors improve measurement of kinematic motion of the club 100, including twist of the golf club shaft around the axis. Further, the sensor device 10 may improve the relative spacing and orientation of the grip sensors 60 and the sensor assembly 40. Specifically, the sensor device may be configured to improve the spacing and orientation of the grip sensors and sensor assembly with respect to each other before and during a user's golf swing, such that a static sensor spacing and orientation relationship may be preserved to allow for accurate collection of data from sensors and simplified analysis of a user's swing.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications are incorporated by reference for all purposes. Other combinations are also possible as will be gleaned from the following claims, which are also hereby incorporated by reference into this written description.

The invention claimed is:

1. A sensor device, comprising:
   a sleeve portion having a length that extends between a first end and an opposing second end and along a central longitudinal axis, the sleeve portion is adapted to be installed over a grip located on a shaft of a golf club,
   a plurality of piezoresistive grip sensors that are embedded within the sleeve portion and adapted to sense information associated with hands of a user gripping the sleeve portion, the plurality of grip sensors include: one or more first sensors for sensing a position of discrete portions of a first hand of the user, and one or more second sensors for sensing a position of discrete portions of a second hand of the user; and
   a sensor assembly coupled to sleeve portion, the sensor assembly adapted to sense the movement of the golf club by the user;
   wherein the sleeve portion comprises a flap and an aperture that is accessible through the flap, the flap is defined by:
   i) a first slit that begins and extends from the second end of the sleeve portion, along the length of the sleeve portion, towards the first end of the sleeve portion to a terminal region, the terminal region located between the first end and the second end such that the first slit is free from extending all the way to the first end of the sleeve portion; and
   ii) a second slit that begins at the terminal region of the first slit and extends only partially around a circumference of the sleeve portion;
   wherein the flap is configured to be moved or opened by deforming an edge of the flap which opposes the first slit, to expose the aperture and to allow for the grip of the golf club to be placed into the aperture, and after the grip of the golf club is placed into the aperture, the flap is configured to be moved or closed about the edge to cover the grip of the golf club.

2. The sensor device according to claim 1, wherein the golf club is a device used with a video game system.

3. The sensor device according to claim 1, wherein the first end of the sleeve portion is a distal portion of the sensor device that is adjacent to a butt end of the golf club, and wherein the sensor assembly is in the first end.

4. The sensor device according to claim 1, wherein the sleeve portion includes an outer surface which is gripped by the user of the sensor device during use of the golf club.

5. The sensor device according to claim 2, wherein the sensor assembly comprises an accelerometer and a gyroscope to sense movements of the golf club by the user.

6. The sensor device according to claim 5, wherein the plurality of grip sensors are electrically coupled to the sensor assembly, and the sensor assembly is configured to store data from the grip sensor, the accelerometer and the gyroscope.

7. The sensor device according to claim 1, wherein the plurality of grip sensors are electrically coupled to the sensor assembly, and the sensor assembly is configured to store data from the grip sensor, the accelerometer and the gyroscope.

8. The sensor device according to claim 7, wherein the sensor assembly further includes a transmitter that is configured to transmit the stored data wirelessly to a receiver.

9. The sensor device according to claim 1, further comprising a flexible printed circuit board coupled to the sleeve portion and in electrical communication with the plurality grip sensors.

10. The sensor device according to claim 9 wherein the flexible printed circuit board includes electrical traces for connecting the plurality of grip sensors to the sensor assembly.

11. The sensor device according to claim 10, wherein the flexible printed circuit board is comprised of an outer layer and an inner layer spaced apart from the outer layer, wherein the plurality of grip sensors are disposed between the outer layer and the inner layer.

12. The sensor device according to claim 1, wherein the plurality of grip sensors and the sensor assembly maintain a fixed orientation and spacing to one another when the sensor device is installed on the golf club.

13. The sensor device according to claim 1, wherein the edge of the flap is parallel to the first slit.

14. The sensor device according to claim 13, wherein the sleeve portion comprises:
   i) a grip layer, which is gripped by the hands of the user;
   ii) an outer layer located below the grip layer, the outer layer comprises a polyimide material and includes a flexible printed circuit board;
   iii) an adhesive between the grip layer and the outer layer;
   iv) a sensor layer below the outer layer, the second layer comprising the piezoresistive grip sensors;
   v) an adhesive between the outer layer and the sensor layer;
   vi) an inner layer below the sensor layer, the inner layer comprises another flexible printed circuit board;
   vii) an adhesive between the sensor layer and the inner layer;
   viii) a coating layer below the inner layer, the coating layer comprises a rubber material.

15. The sensor device according to claim 1, wherein the sensor device comprises a recess formed at the first end of the sensor device, and the sensor assembly is disposed within the recess.

16. The sensor device according to claim 15, wherein the recess is accessible from within the aperture.

17. The sensor device according to claim 16, wherein the sleeve portion comprises:
   i) a grip layer, which is gripped by the hands of the user;
   ii) an outer layer located below the grip layer, the outer layer comprises a polyimide material and includes a flexible printed circuit board;
   iii) an adhesive between the grip layer and the outer layer;
   iv) a sensor layer below the outer layer, the second layer comprising the piezoresistive grip sensors;
   v) an adhesive between the outer layer and the sensor layer;
   vi) an inner layer below the sensor layer, the inner layer comprises another flexible printed circuit board;
   vii) an adhesive between the sensor layer and the inner layer;
   viii) a coating layer below the inner layer, the coating layer comprises a rubber material.

* * * * *